Figure 1:
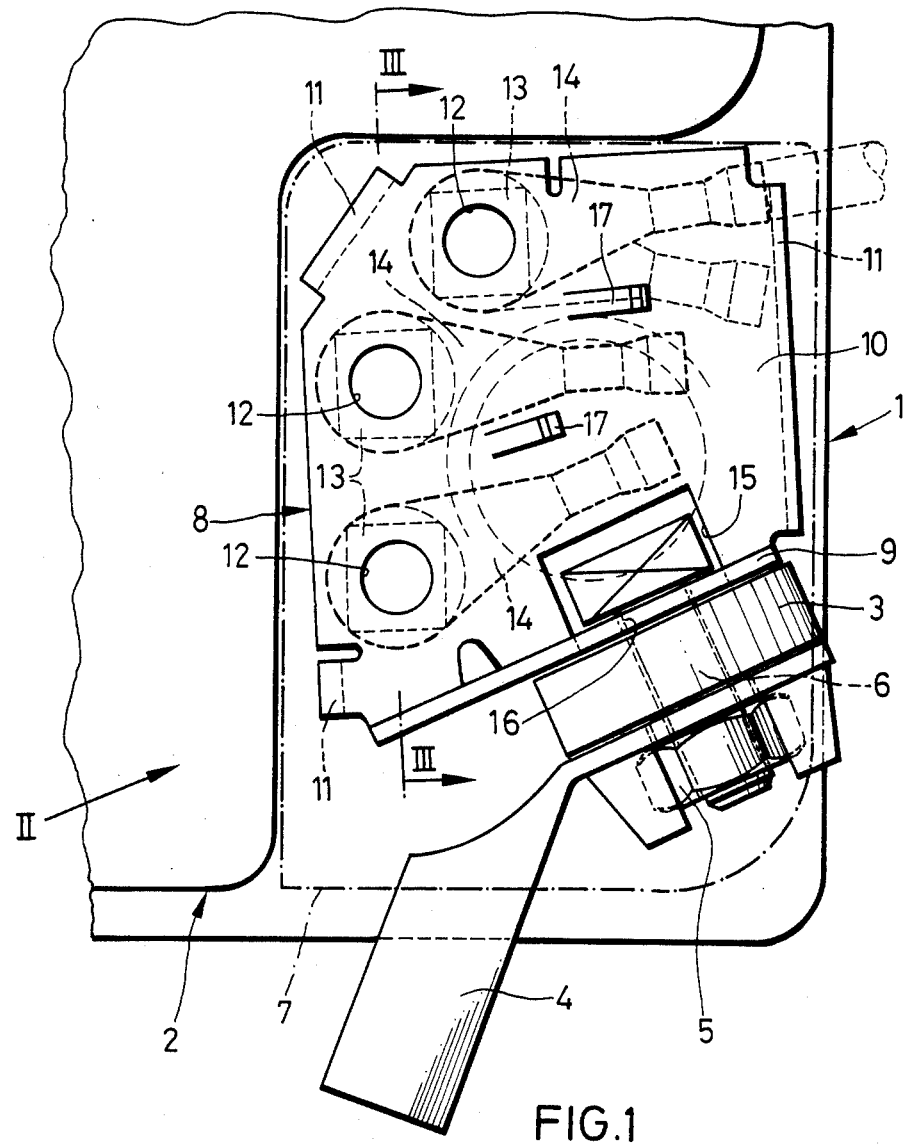

United States Patent [19]

Coesfeld et al.

[11] Patent Number: 4,575,178

[45] Date of Patent: Mar. 11, 1986

[54] CONNECTOR FOR SECURING WIRES TO A BATTERY TERMINAL

[75] Inventors: Manfred Coesfeld, Pulheim; Friedrich Helbert, Hurth, both of Fed. Rep. of Germany

[73] Assignee: Ford Motor Company, Dearborn, Mich.

[21] Appl. No.: 629,155

[22] Filed: Jul. 9, 1984

[30] Foreign Application Priority Data

Sep. 15, 1983 [DE] Fed. Rep. of Germany ....... 3333308

[51] Int. Cl.⁴ ............................................ H01R 11/26
[52] U.S. Cl. ..................................... 339/224; 339/231
[58] Field of Search ..................... 339/29 B, 224, 230, 339/263 B, 231

[56] References Cited

U.S. PATENT DOCUMENTS

| | | | |
|---|---|---|---|
| 3,042,891 | 7/1962 | Navarro | 339/224 |
| 3,230,499 | 1/1966 | Haegert | 339/230 |
| 3,407,382 | 10/1968 | Haegert | 339/230 R |
| 3,407,383 | 10/1968 | Haegert | 339/230 |
| 3,745,516 | 7/1973 | Lieberman | 339/228 |
| 4,354,726 | 10/1982 | Kato et al. | 339/230 |
| 4,377,317 | 3/1983 | Shekel et al. | 339/29 |

FOREIGN PATENT DOCUMENTS 7440606 4/1978 Fed. Rep. of Germany .
629457 12/1949 United Kingdom .

*Primary Examiner*—Gil Weidenfeld
*Assistant Examiner*—Paula A. Austin
*Attorney, Agent, or Firm*—Paul K. Godwin, Jr.; Robert D. Sanborn

[57] ABSTRACT

The invention relates to a connector for enabling wires to be connected to a battery terminal, comprising a conducting component having a portion for attachment to the battery terminal and a further portion formed with bores for enabling additional connections to be made.

The conducting component comprises a base plate 10 formed with bores 12 capable of directly engaging with male screwthreaded members for establishing the desired additional connections. The portion 9 for connection to the terminal 3 projects from the plane of the base plate 10, and the base plate 10 is provided with support flanges 11 to space the bores 12 from the surface of the battery.

9 Claims, 3 Drawing Figures

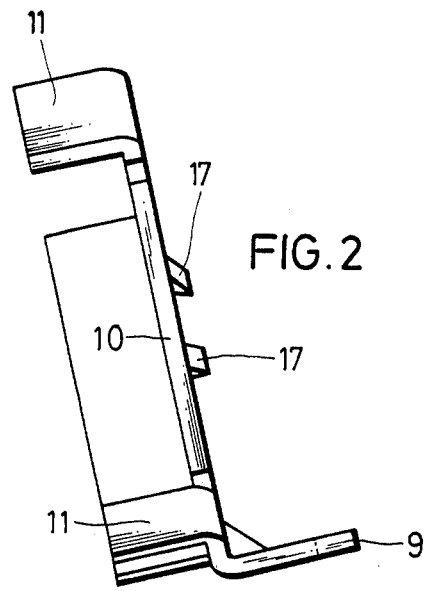
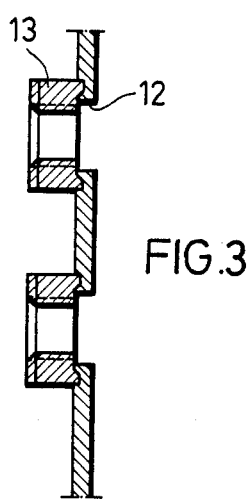

CONNECTOR FOR SECURING WIRES TO A BATTERY TERMINAL

The invention relates to a connector for securing wires to a battery terminal in particular for a motor vehicle battery.

A vehicle battery terminal usually comprises a post to which a heavy duty starter cable is connected directly. It is sometimes desired to connect further wires to the same post and the invention seeks to provide a connector to facilitate this task.

A connector for permitting several leads to be connected to the same terminal of a battery is known from German Gebrauchsmuster No. 74 40 606. This connector is in the form of a long strip formed at one end with a clamp for attachment to the post of the battery terminal and formed along its length with bores for enabling different wires to be connected to the battery.

The bores for the further connections are arranged at some distance from the clamp and are therefore unprotected in the engine space. Furthermore, the attachment of the wires is not absolutely secure and trouble-free.

The invention seeks to provide a connector for a battery, in particular of a motor vehicle, in which the further connections are better protected and more secure.

According to the present invention, there is provided a connector for enabling wires to be connected to a battery terminal, comprising a conducting component having a portion for attachment to the battery terminal and a further portion formed with bores for enabling additional connections to be made, characterised in that the conducting component comprises a base plate formed with bores capable of directly engaging with male screw-threaded members for establishing the desired additional connections, in that the portion for attachment to the battery terminal post projects from the plane of the base plate, and in that the base plate is provided with support flanges to space the bores from the surface of the battery.

An advantage of the invention is that the additional connections are located in the immediate vicinity of the battery terminal, so that they may be greased at the same time as the normal vehicle service is performed to protect them from corrosion.

The base plate for the further connections is preferably formed in such a way that it is disposed inside the space surrounded by the conventional battery terminal cover.

It is preferable also to design the plate with a hole aligned with a slot in the portion for connection to the terminal of the battery, so that the connector may be slipped over the head of the bolt in the battery terminal post without the need for the latter bolt to be withdrawn entirely.

In order to prevent the additional connections from working loose, it is advantageous to provide on the base plate raised tongues to prevent rotation of the wire terminal about their respective securing screws or bolts.

For a flat terminal post type of battery, the connector is conveniently formed from bent sheet metal. A cast metal part of diecast metal or case bronze, is more favourable for batteries with round terminals.

In a further embodiment the connector is in the form of a moulded plastics part with contact plates and strip conductors integrally moulded thereon or rivetted thereto. In the case of this embodiment, an economical use of high-quality conductive material, such as for example copper or brass, is possible with a good spatial arrangement of the additional connections.

The invention will now be described further, by way of example, with reference to the accompanying drawings, in which:

FIG. 1 is a plan view of the terminal of a starter battery fitted with a connector of the invention, FIG. 2 is a side view of the connector in FIG. 1 viewed in the direction of the arrow II, and FIG. 3 is a section through the connector taken along the line III in FIG. 1.

A battery 1 of a motor vehicle comprises a casing which is recessed in one corner in the region surrounding the terminal post 3. The post 3 may be flat or cylindrical, the illustrated post 3 being designed for connection to a heavy duty starter cable 4 by means of a threaded bolt and a fastening nut 5. The recessed corner region in the casing 2 may be covered by a clip-on battery terminal cover 7 which is indicated by dash-dot lines.

A connector 8 for permitting further wires to be connected to the same post 3 consists of a sheet-metal part, having a base plate 10 onto which the further connections are made and an angled flange 9 for attachment to the post 3. The base plate 10 is held at a distance from the battery surface by means downwardly bent support flanges 11. The base plate 10 is provided with bores 12, on whose underside are inserted punched nuts 13. The end terminals 14 of the wires to be connected to the battery are secured by means of screws directly engaging in the nut 13.

An opening 15 is provided on the base plate 10 which merges with a slot 16 formed in the angled flange 9. In this way, the connector may be slipped over the head of the bolt 6 after it has been loosened, without it being necessary to withdraw the bolt 6 entirely. The connector is held securely in position by tightening the bolt 6.

There are further formed on the base plate 10 raised tongues 17 which prevent the end terminals 14 from rotating about their respective fastening screws, which are threaded into the nuts 13.

Although the invention has been described and explained with reference to a battery with a flat terminal post, the person skilled in the art can readily develop an embodiment designed for use with a round terminal post, which provides the advantages of reliable and troublefree further connections.

A cast metal part of diecast metal or cast bronze, in which the appropriate threaded holes have been provided, can advantageously be used for an embodiment for a battery with a round terminal.

In a very inexpensive embodiment, the base plate of the connector is injection-moulded from a plastics material, contact plates and strip conductors being either integrally injection-moulded or secured by rivetting to the base plate 10. In this way, a desirable high-quality conductive material, such as copper or brass, can be used providing a good spatial arrangement, without resulting in excessive costs.

It is possible to make all the embodiments even less expensive omitting the nuts or threaded bores and, instead, relying on self tapping screws to connect the further wires to the base plate.

We claim:

1. A connector for enabling a plurality of electrical wires to be individually connected to a battery terminal post extending from the housing surface of an electric storage battery, comprising a conducting component having a portion for attachment to the battery terminal post and a base plate portion formed with bores capable of being directly engaged by male screw-threaded members for establishing the desired electrical wire connections, wherein the portion for attachment to the battery terminal post projects from the plane of the base plate, and the base plate is provided with support flanges to space the bores from the housing surface of the battery.

2. A connector a claimed in claim 1, wherein the base plate is dimensioned to fit within a recess in the battery surrounding the terminal.

3. A connector as claimed in claim 1, wherein the base plate is provided with an opening which merges with a slot formed in the portion for attachment to the battery terminal post.

4. A connector as claimed in claim 1, wherein the base plate is provided with raised tongues serving to prevent wire terminals of the wire connections from rotating.

5. A connector as claimed in claim 1, wherein the connector is formed as a bent sheet-metal part.

6. A connector as claimed in claim 1, wherein the connector is in the form of a cast metal part.

7. A connector as claimed in claim 1, wherein the connector is in the form of plastics injection moulded part to which suitable contact plates and strip conductors are integrally moulded or secured by rivetting.

8. A connector as claimed in claim 1, in which the bores are not internally threaded and are operative to receive self-tapping screws.

9. A connector as claimed in claim 1, wherein punched or welded nuts are mounted on the underside of the base plate.

* * * * *